(12) United States Patent
Kelly et al.

(10) Patent No.: US 11,318,973 B2
(45) Date of Patent: May 3, 2022

(54) BEACH WAGON

(71) Applicants: Phillip Earl Kelly, Rancho Santa Fe, CA (US); Chris Crawford, Carlsbad, CA (US)

(72) Inventors: Phillip Earl Kelly, Rancho Santa Fe, CA (US); Chris Crawford, Carlsbad, CA (US)

( * ) Notice: Subject to any disclaimer, the term of this patent is extended or adjusted under 35 U.S.C. 154(b) by 0 days.

(21) Appl. No.: 17/092,844

(22) Filed: Nov. 9, 2020

(65) Prior Publication Data

US 2021/0139062 A1 May 13, 2021

Related U.S. Application Data

(60) Provisional application No. 62/933,092, filed on Nov. 8, 2019.

(51) Int. Cl.
| | | |
|---|---|---|
| *B62B 3/02* | (2006.01) | |
| *A47C 1/14* | (2006.01) | |
| *B62B 5/06* | (2006.01) | |
| *B62B 9/14* | (2006.01) | |

(52) U.S. Cl.
CPC ................ *B62B 3/02* (2013.01); *A47C 1/146* (2013.01); *B62B 5/067* (2013.01); *B62B 9/147* (2013.01); *B62B 2202/52* (2013.01); *B62B 2206/006* (2013.01); *B62B 2207/02* (2013.01)

(58) Field of Classification Search
CPC ........... B62B 3/02; B62B 5/067; B62B 9/147; B62B 2207/02; B62B 2202/52; B62B 2206/006; B62B 5/049; B62B 3/007; B62B 5/0013; B62B 3/022; B62B 5/085; B62B 2204/06; B62B 5/04; A47C 1/146; A47C 13/00; A47C 1/14; A45B 220/10
See application file for complete search history.

(56) References Cited

U.S. PATENT DOCUMENTS

| | | | | |
|---|---|---|---|---|
| 6,079,777 A | * | 6/2000 | Simmons | ................... B62B 3/02 |
| | | | | 297/217.1 |
| 9,851,050 B1 | * | 12/2017 | Cano | ......................... A47C 7/66 |
| 10,507,856 B1 | * | 12/2019 | Malson | ..................... A47C 4/20 |

(Continued)

FOREIGN PATENT DOCUMENTS

| | | | | |
|---|---|---|---|---|
| CN | 206079354 U | * | 4/2017 | |
| CN | 208243245 U | * | 12/2018 | |
| FR | 3021853 A1 | * | 12/2015 | ............. A47C 1/143 |

*Primary Examiner* — James A Shriver, II
*Assistant Examiner* — Ian Bryce Shelton

(57) ABSTRACT

An objective of the beach wagon is to provide users with a 3-in-1 outdoor accessory. In order to accomplish this, the beach wagon provides a multifunctional structure which can be utilized as a normal wagon as well as a beach chair. The beach umbrella configuration of the beach wagon further enables the attachment of an umbrella to provide a beach chair and umbrella combo. The structure of the beach wagon provides a foldable frame which can be configured into a wagon configuration or a chair configuration. Further, the foldable frame of the beach wagon enables easy and compact storage in the back of a vehicle. Additionally, the beach wagon is equipped with wide sand tires, and accommodates various secondary attachments such as cup holders, coolers etc. Furthermore, a modular wheel system of the beach wagon allows users to use different size and type of wheels.

14 Claims, 13 Drawing Sheets

(56) References Cited

U.S. PATENT DOCUMENTS

| | | | |
|---|---|---|---|
| 10,610,025 B1* | 4/2020 | Zhu | A47C 13/00 |
| 10,716,404 B1* | 7/2020 | Weldon | B62B 1/20 |
| 2006/0071513 A1* | 4/2006 | Pedemonte | A47C 1/143 |
| | | | 297/16.1 |
| 2009/0066114 A1* | 3/2009 | Molton | B62B 3/022 |
| | | | 296/180 |
| 2010/0156069 A1* | 6/2010 | Chen | B62B 3/007 |
| | | | 280/639 |
| 2011/0025005 A1* | 2/2011 | Howell | B62B 3/022 |
| | | | 280/47.24 |
| 2011/0079972 A1* | 4/2011 | Watson | B62B 3/02 |
| | | | 280/47.4 |
| 2013/0320641 A1* | 12/2013 | Zhang | B62B 9/082 |
| | | | 280/47.38 |
| 2015/0061332 A1* | 3/2015 | Dowell | A47C 7/622 |
| | | | 297/188.01 |
| 2018/0263372 A1* | 9/2018 | Rohrer | A47C 4/28 |
| 2019/0023299 A1* | 1/2019 | Simmons | B60B 37/10 |
| 2019/0126963 A1* | 5/2019 | Chapus | B62B 5/00 |
| 2020/0031376 A1* | 1/2020 | Horowitz | B62B 3/007 |
| 2020/0107642 A1* | 4/2020 | Weldon | A47C 1/14 |
| 2020/0405063 A1* | 12/2020 | Bulger | A47C 7/664 |
| 2021/0002919 A1* | 1/2021 | Camillo | B62B 5/06 |

\* cited by examiner ns
BEACH WAGON

The current application claims a priority to the U.S. Provisional Patent application Ser. No. 62/933,092 filed on Nov. 8, 2019. The current application is filed on Nov. 9, 2020 while Nov. 8, 2020 was on a weekend.

FIELD OF THE INVENTION

The present invention relates generally to mobile devices and outdoor accessories. More specifically, the present invention provides a multifunctional wagon which can be utilized as a normal wagon or a beach chair.

BACKGROUND OF THE INVENTION

A popular and classic summer getaway that both kids and adults enjoy includes visiting the beach and indulging in associated beach activities. However, carrying a lot of properties for the beach, finding a clean spot to sit, and finding some shade on very sunny days are all challenges that beach visitors often encounter.

An objective of the present invention is to provide a 3-in-1 beach wagon. The present invention provides a multifunctional structure which can be utilized as a normal wagon as well as a beach chair. The beach umbrella configuration of the present invention further enables the attachment of an umbrella to provide a beach chair and umbrella combo. The structure of the beach wagon provides a foldable frame which can be configured into a wagon configuration or a chair configuration. Further, the foldable frame of the beach wagon enables easy storage of the present invention in the back of a vehicle. In the preferred embodiment, the present invention designed to seat two adults, is equipped with wide sand tires, and accommodates various secondary attachments such as cup holders. Furthermore, the present invention comprises a modular wheel system that allows users to use different size and type of wheels. Thus, the present invention is a user-friendly, efficient and multi-functional outdoor accessory.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 13, the present invention, is a multi-functional beach wagon. An objective of the present invention is to provide a 3-in-1 beach wagon. The present invention provides a multifunctional structure which can be utilized as a normal wagon as well as a beach chair. The beach umbrella configuration of the present invention further enables the attachment of an umbrella to provide a beach chair and umbrella combo. The structure of the beach wagon provides a foldable frame which can be configured into a wagon configuration or a chair configuration. Further, the foldable frame of the beach wagon enables easy storage of the present invention in the back of a vehicle. In the preferred embodiment, the present invention designed to seat two adults, is equipped with wide sand tires, and accommodates various secondary attachments such as cup holders. Furthermore, the present invention comprises a modular wheel system that allows users to use different size and type of wheels. Thus, the present invention is a user-friendly, efficient and multi-functional outdoor accessory.

Figure 1:
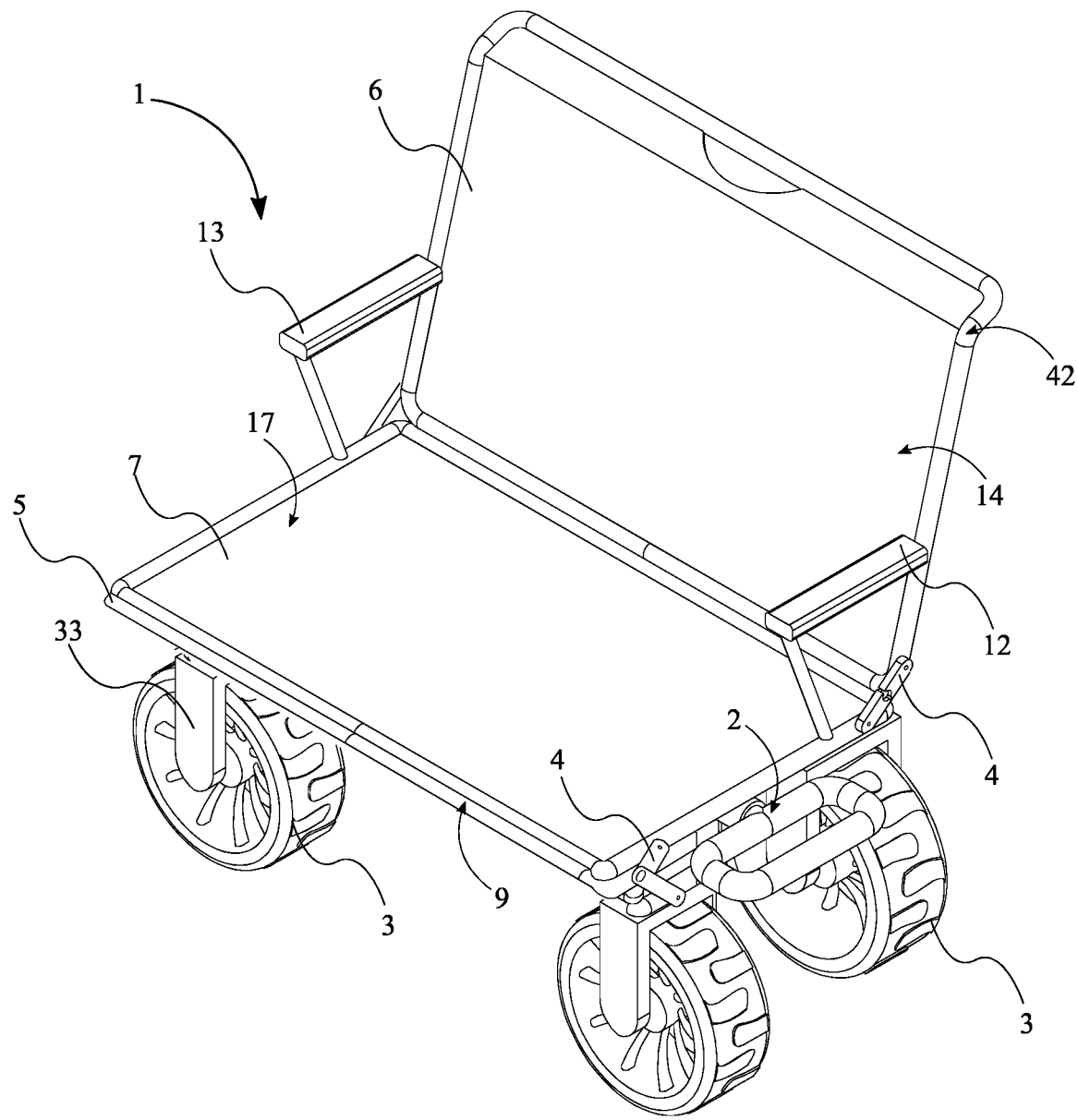
FIG. 1 is a top-front-left perspective view of the present invention in a chair configuration, wherein the handle mechanism is stored away.
Figure 2:
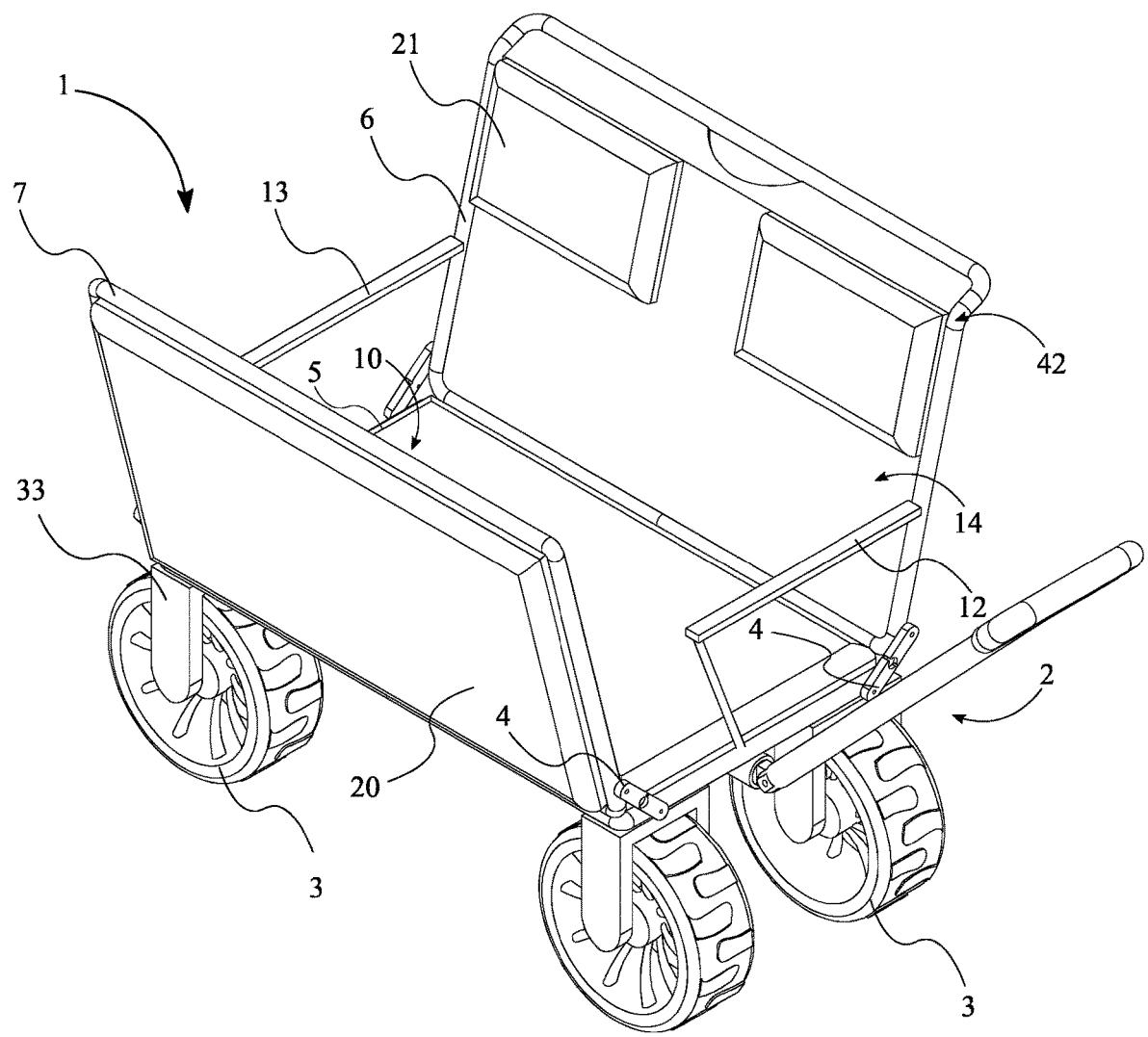
FIG. 2 is a top-front-left perspective view of the present invention, wherein the handle mechanism is deployed, the leg panel comprises a padding, and the back panel comprises head rests.
Figure 3:
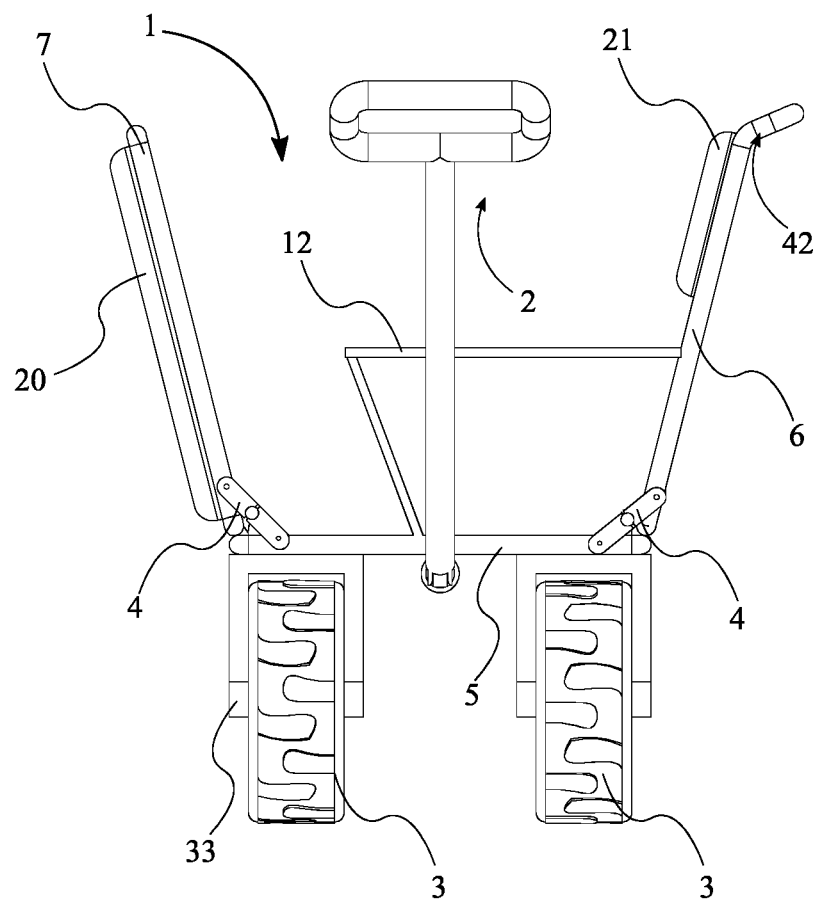
FIG. 3 is a left side elevational view of the present invention in FIG. 2.

The following description is in reference to FIG. 1 through FIG. 13. In a preferred embodiment of the present invention, the multifunctional beach wagon comprises a frame 1, a handle mechanism 2, a plurality of wheels 3, and a plurality of locking hinges 4. The frame 1 enables a user to arrange the present invention into different configurations, which include a wagon configuration and a chair configuration. In order to accomplish that, the frame 1 comprises a seat panel 5, a back panel 6, and a leg panel 7. As seen in FIG. 1, the seat panel 5, the back panel 6 and the leg panel 7 are rectangular frames with a flat sturdy fabric/material stretched across the frames. However, the frame 1 may comprise any other shape, size, material, components and arrangement of components, as long as the objectives of the present invention are fulfilled. According to the preferred embodiment, the seat panel 5 comprises a first seat edge 8, a second seat edge 9, a first surface 10 and a second surface 11, wherein the first seat edge 8 is positioned opposite to the second seat edge 9 across the seat panel 5 and the first surface 10 is positioned opposite to the second surface 11 across the seat panel 5. More specifically, the first surface 10 constitutes the upper surface, the second surface 11 constitutes the bottom surface of the seat panel 5, and the first seat edge 8 and the second seat edge 9 constitute the longer edges of the rectangular seat panel 5. Preferably, the seat panel 5 forms the center structure around which, various other components are attached to, to form the multi-functional beach wagon. To that end, the back panel 6 is hingedly connected to the first seat edge 8, and the leg panel 7 is hingedly connected to the second seat edge 9. As seen in FIG. 2 and FIG. 3, the back panel 6 and the leg panel 7 form the other important parts of the frame 1 that may be positioned in multiple ways, so as to enable formation of the various configurations of the present invention.

In order to enable easy maneuvering and handling of the multi-functional beach wagon, the handle mechanism 2 is integrated into the frame 1. The handle mechanism 2 may be deployed so as to enable the users to handle and transport the present invention during the wagon configuration and the handle mechanism 2 may be stored away during the chair configuration. As seen in FIG. 1 through FIG. 13, the handle mechanism 2 comprises a sturdy elongated section and an ergonomic handle section. However, the handle mechanism 2 may comprise any other shape, size, attachment means, swiveling mechanisms, integrated maneuvering technology etc., that are known to one of ordinary skill in the art, as long as the intents of the present invention are not altered. For example, the handle mechanism may be connected to the front wheels of the beach wagon, such that steering the handle mechanism 2 enables steering of the front wheels, and thereby the wagon's direction of motion. Continuing with the preferred embodiment, the plurality of wheels 3 is connected onto the second surface 11 of the seat panel 5. The plurality of wheels 3 enables the transportation of the present invention across various terrains including the beach. Preferably, the plurality of wheels 3 comprise all terrain wheels, that easily move in the sand. However, the plurality of wheels 3 may comprise any other size, number, shape, and technology, as long as the objectives of the present invention are not altered. In order to hold the various panels of the frame 1 in a secure fashion, the plurality of locking hinges 4 is integrated between the seat panel 5, the back panel 6 and the leg panel 7. In other words, the plurality of locking hinges 4 may be connected at one or more positions between any components of the frame 1 and or other parts the present invention, so as to improve the stability and enable various angular orientations of the present invention. Furthermore, the plurality of locking hinges 4 is operatively coupled to the frame 1, wherein the plurality of locking hinges 4 enables the frame 1 to switch between the wagon configuration, the chair configuration and a collapsed configuration. Preferably, the plurality of locking hinges 4 is bendable and/or rotatable around a swivel point or ball joint and comprises a locked position and collapsed position. However, the plurality of locking hinges 4 may comprise any other fasteners or fastening mechanisms that are known to one of ordinary skill in the art, as long as the intents of the present invention are fulfilled.

Figure 6:
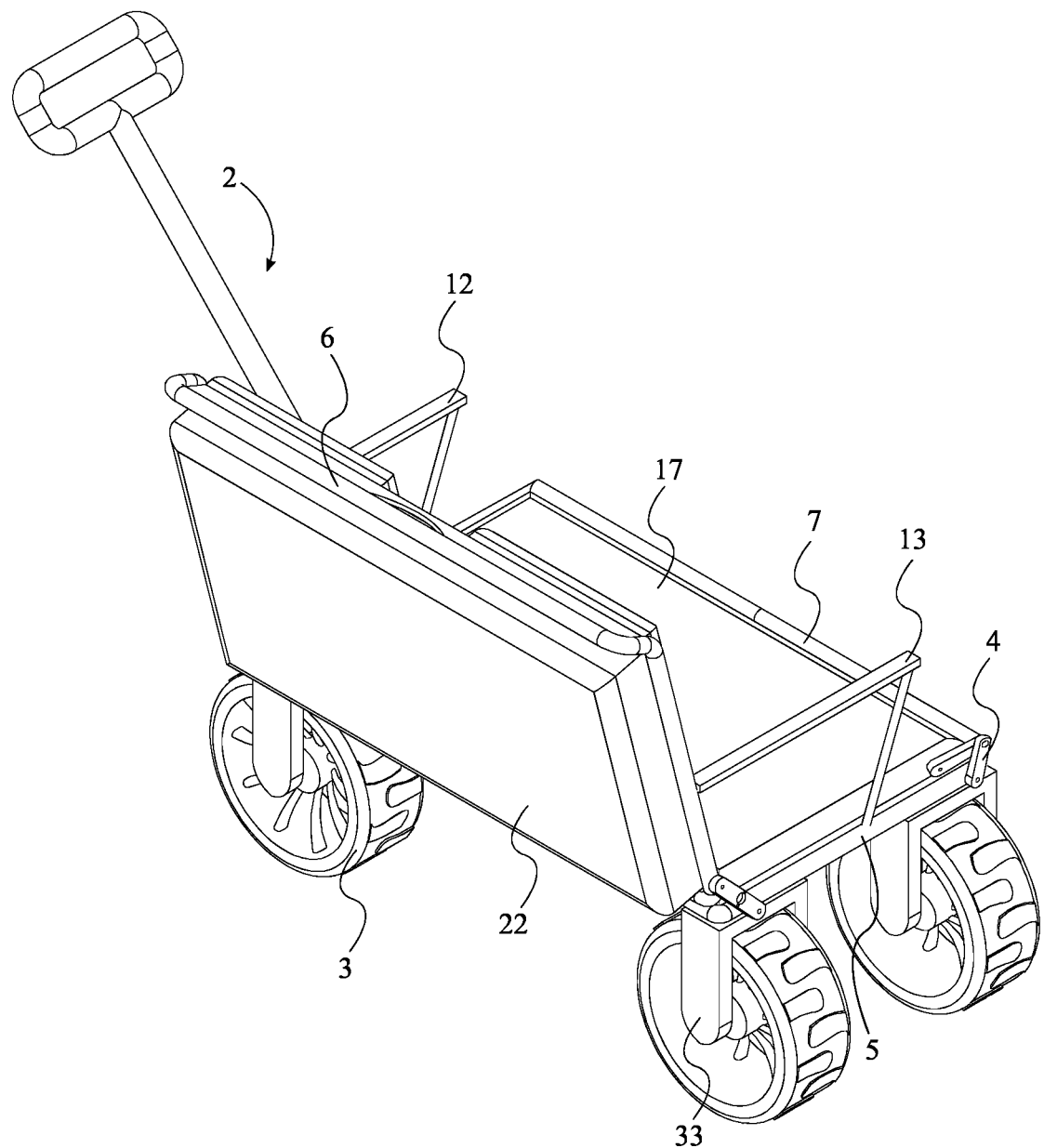
FIG. 6 is a top-rear-right perspective view of the present invention, wherein the back panel comprises a cooler attachment.
Figure 7:
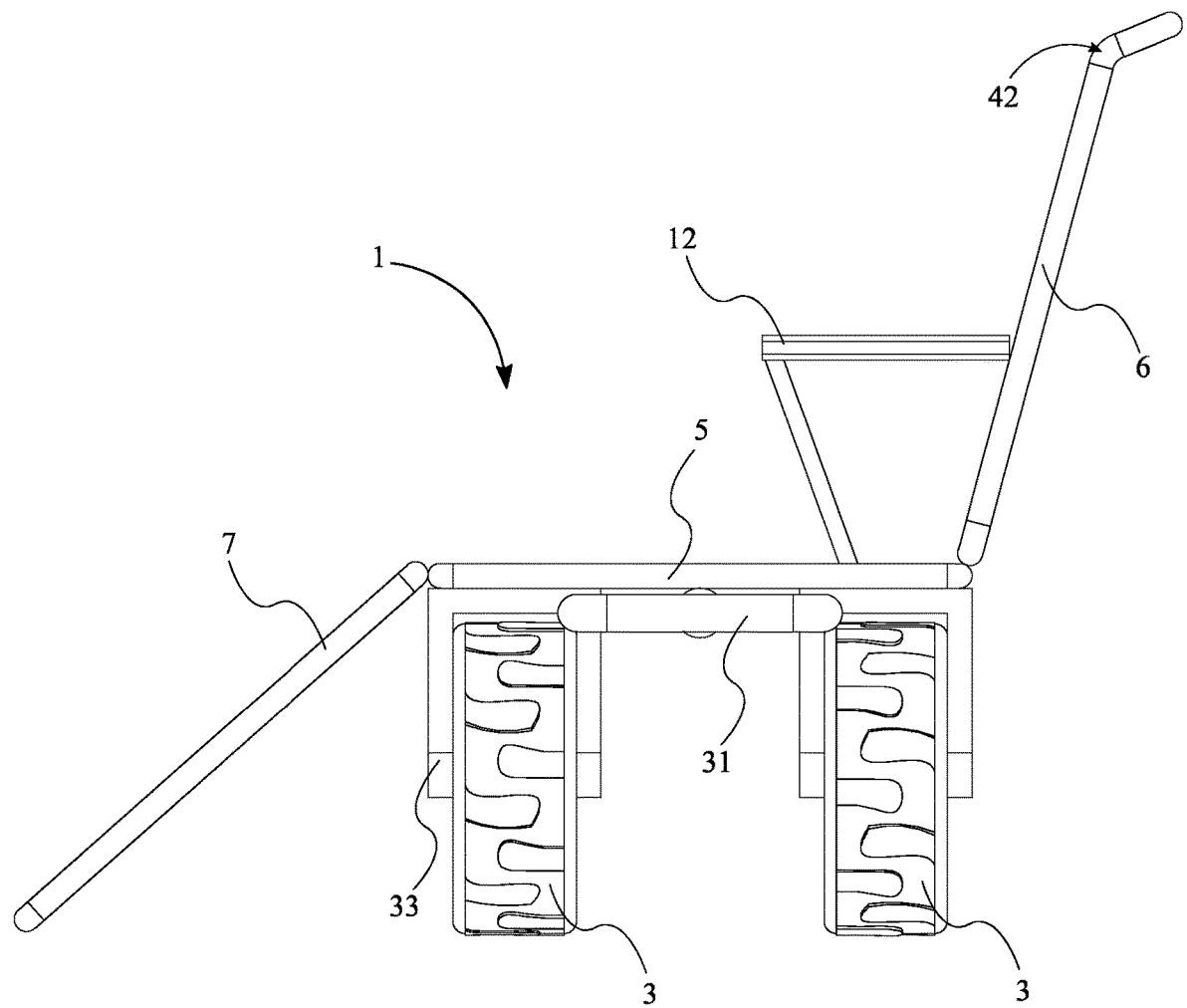
FIG. 7 is a left side elevational view of the present invention showing the beach wagon in the chair configuration with the handle attachment stored away, and the leg panel being positioned away from the seat panel.

Continuing with the preferred embodiment of the present invention, the multifunctional beach wagon further comprises, a first arm rest 12, and a second arm rest 13. The set of armrests provide comfort to users during the chair configuration and prevents items from falling off in the wagon configuration. To that end, the first armrest 12 and the second armrest 13 are connected between the seat panel 5 and the back panel 6, wherein the first armrest 12 and the second armrest 13 are normally offset from the seat panel 5. In other words, the set of armrests are perpendicular to the seat panel 5, wherein the set of armrests is designed to be folded away with the leg panel 7 and the back panel 6 in the collapsed configuration. Further, as seen in FIG. 1, FIG. 2, and FIG. 6, the first armrest 12 and the second armrest 13 are laterally offset from each other. Furthermore, in order to provide stability and foldability, the plurality of locking hinges 4 is integrated between the first armrest 12 and the frame 1, and the plurality of locking hinges 4 is integrated between the second armrest 13 and the frame 1.

According with the preferred embodiment, the back panel 6 comprises a first back panel surface 14 and a second back panel surface 15, wherein the first back panel surface 14 is positioned opposite to the second back panel surface 15 across the back panel 6. Preferably, the back panel 6 serves as the back support for users when the beach wagon is in the chair configuration, and the user's back touches the first back panel surface 14 when the user sits on the beach wagon. Further, the leg panel 7 comprises a first leg panel surface 16 and a second leg panel surface 17, wherein the first leg panel surface 16 is positioned opposite to the second leg panel surface 17 across the leg panel 7.

Figure 8:
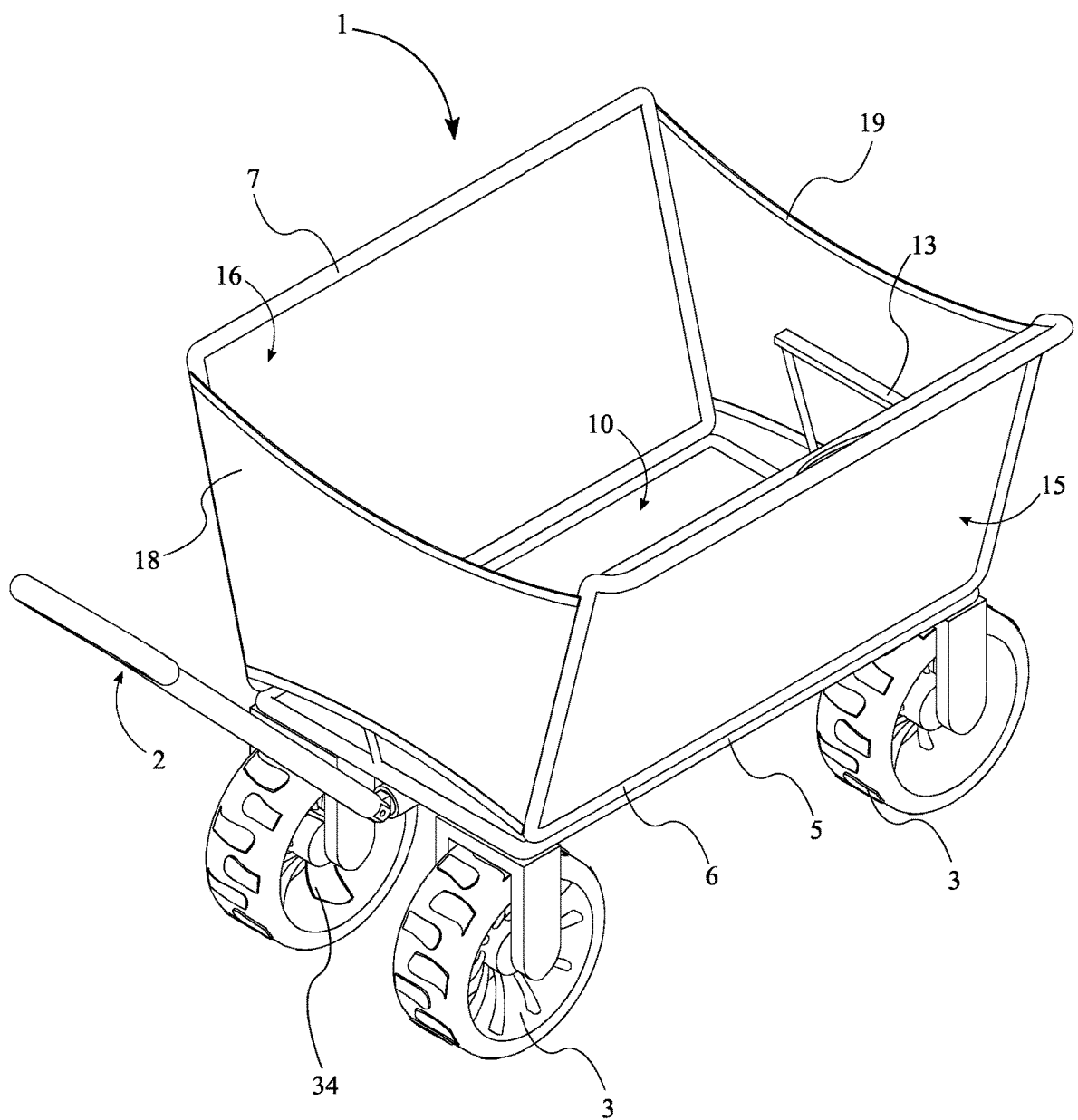
FIG. 8 is a top-rear-left perspective view of the present invention showing the beach wagon in the wagon configuration with the handle mechanism deployed.
Figure 9:
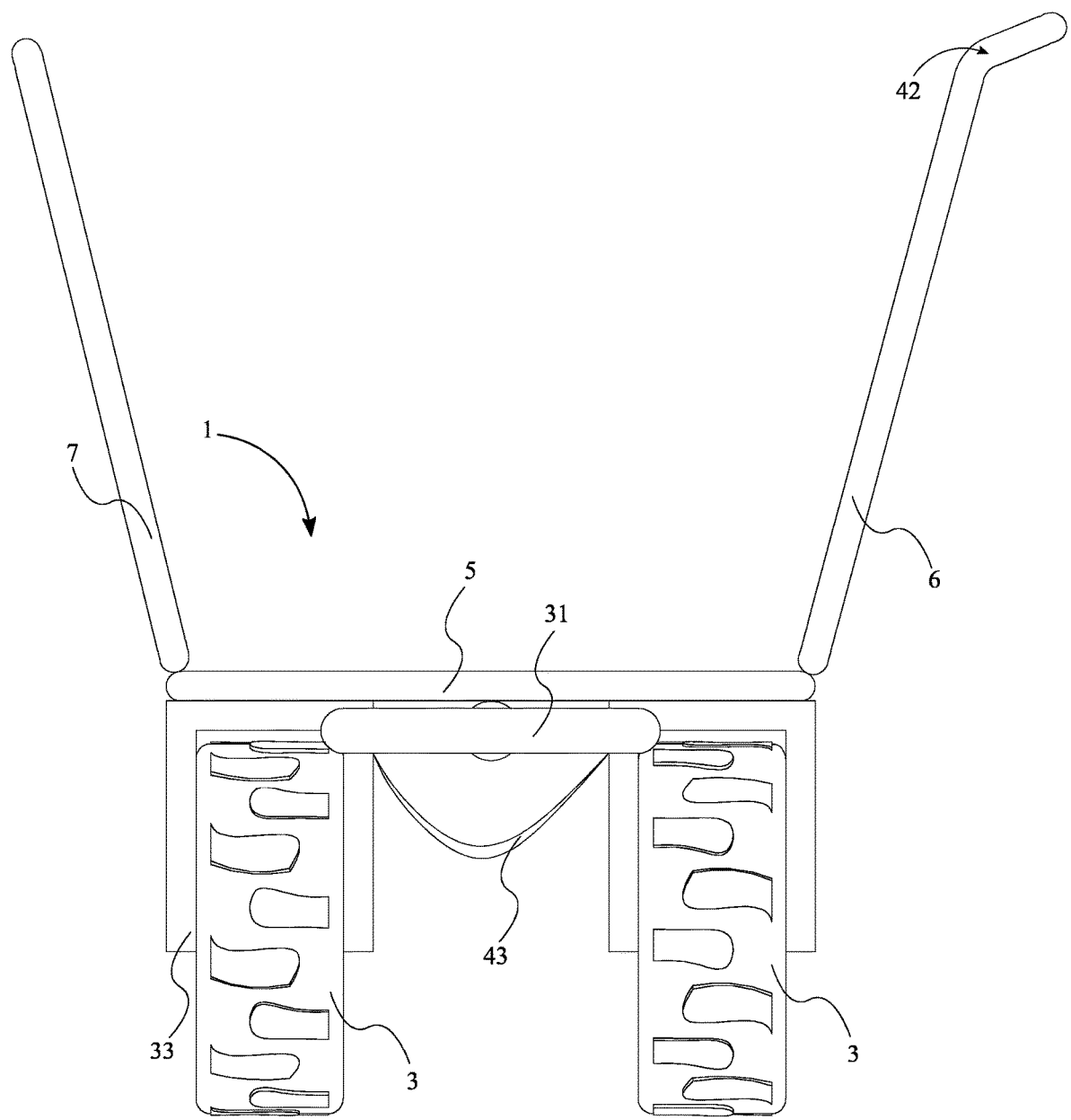
FIG. 9 is a left side elevational view of the present invention showing the beach wagon being folded for storage.

It is an aim of the present invention to provide multiple functionalities and various configurations for users, while using the beach wagon. To that end, when the frame 1 is in the wagon configuration, the frame 1 comprises a first side panel 18, and a second side panel 19. The first side panel 18 and the second side panel 19 are intended to provide supporting side surfaces to the beach wagon, such that things inside the wagon do not fall off through the open sides between the back panel 6 and the leg panel 7. As seen in FIG. 8, the first side panel 18 and the second side panel 19 are removably attached between the first back panel surface 14 and the first leg panel surface 16. Preferably, the first side panel 18 and the second side panel 19 comprise collapsible and flexible materials, such as cargo nets, mesh panels, etc., that may be removed and stored away easily in one of the storage pockets within the beach wagon. Additionally, it is preferred that the first side panel 18 and the second side panel 19 have dimensions that fit between the back panel 6 and the leg panel 7. However, the first side panel 18 and the second side panel 19 may comprise any other size, shape, material, components and arrangements of components that are known to one of ordinary skill in the art, as long as the objectives of the present invention are not hindered. As seen in FIG. 8, the first side panel 18 is laterally offset from the second side panel 19. Additionally, as seen in FIG. 8, when in the wagon configuration, the back panel 6 and the leg panel 7 are angularly offset from the seat panel 5. In order to hold the shape of the wagon and provide stability, the plurality of locking hinges 4 is placed in a locked position. Furthermore, the leg panel 7 is positioned opposite to the back panel 6 across the seat panel 5 in such a way that the first leg panel surface 16 faces the first back panel surface 14.

In the preferred embodiment, the panels of the frame 1 are connected to each other in such a way the frame 1 can be folded into different configurations. Accordingly, when the frame 1 is in a chair configuration, the leg panel 7 is folded and positioned over the first surface 10 of the seat panel 5, such that the first leg panel surface 16 is pressed against the seat panel 5. As seen in FIG. 2 and FIG. 3, the plurality of locking hinges 4 between the back panel 6 and the seat panel 5 is placed in a locked position, and the plurality of locking hinges 4 between the seat panel 5 and the leg panel 7 is in a collapsed position. Thus, the back panel 6 is angularly offset from the seat panel 5 in the chair configuration. In other words, the back panel 6 is folded away from the seat panel 5 to form the backing of the chair configuration. This angular offset provides a comfortable back rest for users while sitting on the multi-functional beach wagon in chair configuration.

Figure 10:
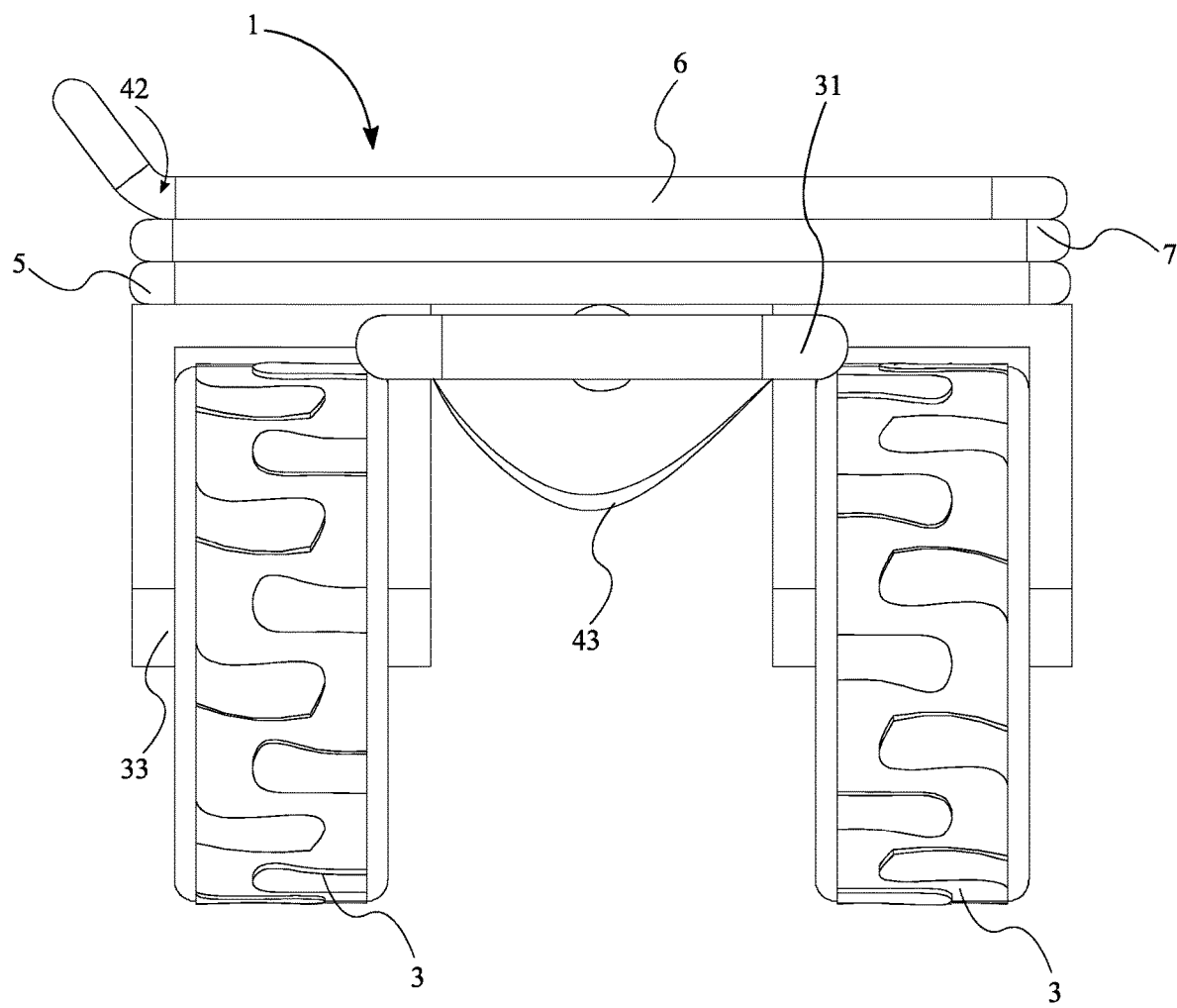
FIG. 10 is a left side elevational view of the present invention in collapsed configuration.

It is an aim of the present invention to enable convenient storage and transportation of the beach wagon. To that end, when the frame 1 is in a collapsed configuration, the plurality of locking hinges 4 is placed in a collapsed position, so as to enable folding away and collapsing of the different panels of the beach wagon. Accordingly, the first armrest 12 and the second armrest 13 are folded and positioned over the first surface 10 of the seat panel. Further, the leg panel 7 is folded and positioned over the seat panel 5, wherein the first leg panel surface 16 faces the first surface 10 of the seat panel 5. Subsequently, the back panel 6 is folded and positioned over the leg panel 7, wherein the first back panel 14 surface is pressed against the second leg panel surface 17. Thus, as seen in FIG. 10, the frame 1 of the beach wagon may be collapsed for compact storage and convenient transportation.

In reference to FIG. 2 and FIG. 3, the multifunctional beach wagon comprises a padded layer 20, and at least one head rest 21. Preferably, the padded layer 20 is mounted onto the second leg panel surface 17, such that the padded layer 20 provides a comfortable cushioning and support for users while sitting on the beach wagon in the wagon configuration. Additionally, the at least one head rest 21 is mounted onto the first back panel surface 14, so as to provide a comfortable neck and head support for users while sitting. Preferably, the padded layer 20 and the at least one head rest 21 comprises a soft and cushiony material filled inside a fabric. However, the padded layer 20 and the at least one head support 21 may comprise any other shape, material and size, as long as the objectives of the present invention is fulfilled.

In reference to FIG. 6, the present invention comprises a cooler attachment 22, which enables users to carry cold items and keep them cool even on a hot beach day. Preferably, the cooler attachment 22 is attached to the second back panel surface 15, comprises a rectangular shape and fits within the dimensions of the back panel. However, the cooler attachment 22 may have any other size and shape as long as the objectives of the present invention are fulfilled.

Figure 4:
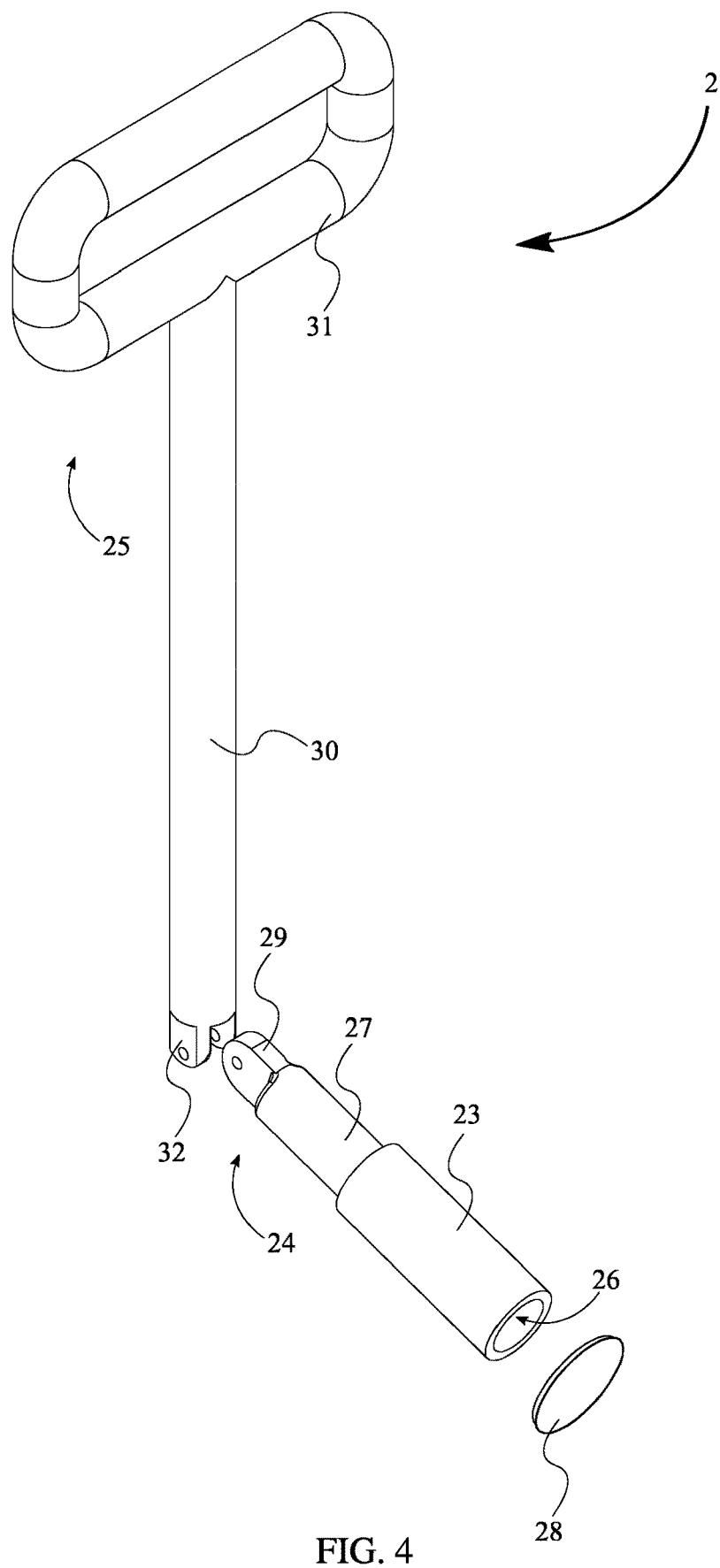
FIG. 4 is an exploded top perspective view of the present invention showing the handle mechanism of the beach wagon.

To further facilitate the transportation of the beach wagon, the handle mechanism 2 is integrated into the frame 1 to enable users to pull on the beach wagon for easy transportation. In order to accomplish that the handle mechanism 2 comprises a sleeve 23, a swivel hinge 24, and a handle 25. According to the preferred embodiment, the sleeve 23 comprises a cavity 26, wherein the cavity 26 traverses through the sleeve 23. Further, the sleeve 23 is connected to the seat panel 5. In other words, the sleeve 23 comprises an open-ended, hollow cylindrical design connected to a lateral edge of the seat panel 5. However, the sleeve 23 may be positioned at any other location along the frame 1 of the present invention or may be connected to any other external swiveling/rotating attachment, as long as the intents of the present invention are not altered. As seen in FIG. 4, the swivel hinge 24 comprising a swivel body 27, a stopper 28, and a swivel hinge end 29. According to the preferred embodiment, the swivel body 27 is threaded through the cavity 26, such that the swivel body 27 may easily traverse through the cavity 26 and enable movement of the swivel hinge 24 along the sleeve 23. Further, the stopper 28 is terminally connected to the swivel body 27, such that the swivel body 27 does not fall out of the sleeve 23. Furthermore, the swivel hinge 24 end is positioned opposite to the stopper 28 across the swivel body 27, such that the swivel hinge end 29 is designed to connect the handle 25 to the swivel hinge 24.

Figure 5:
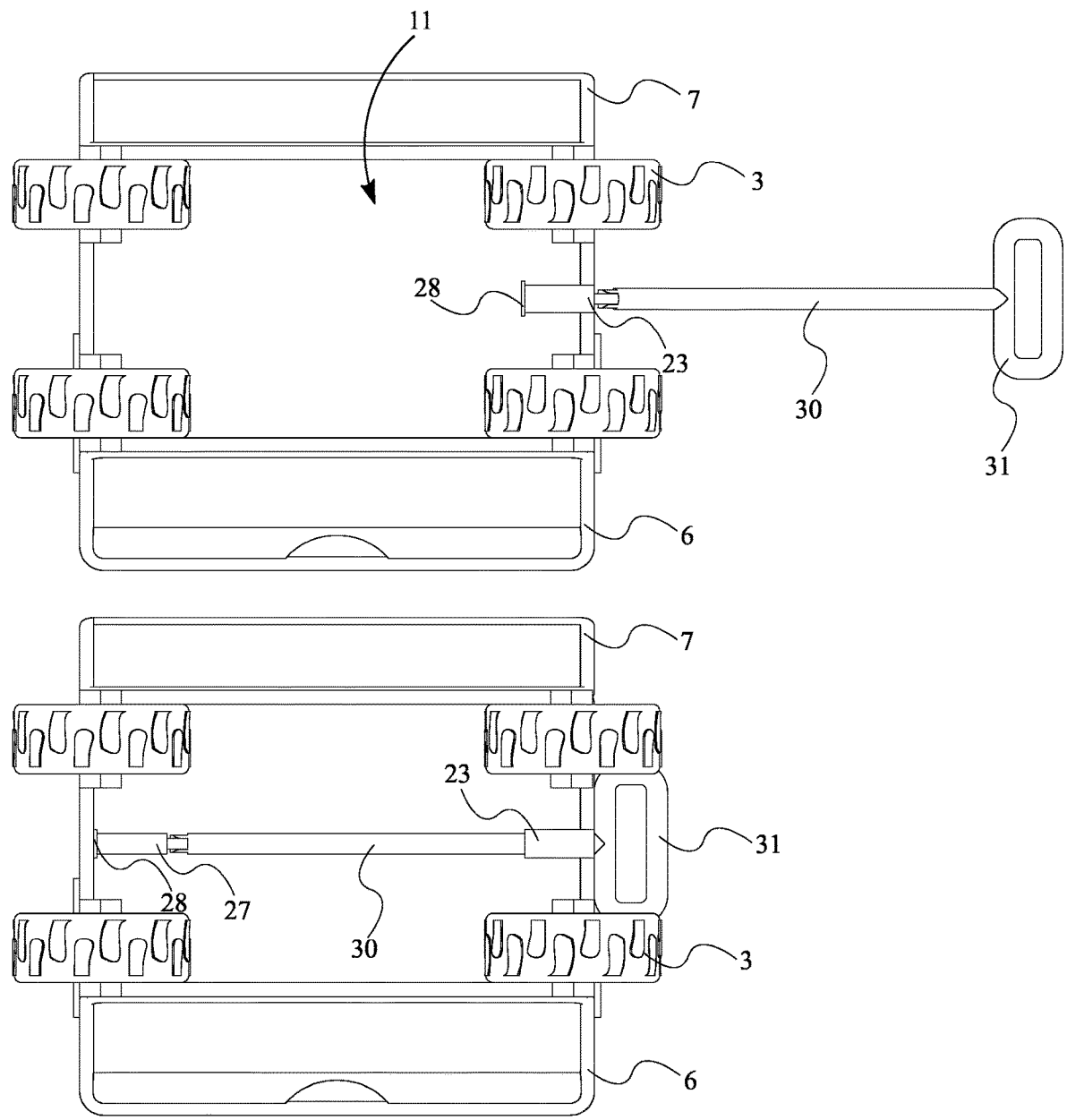
FIG. 5 is a bottom view of the present invention showing the handle mechanism in two configurations.

As can be seen in FIG. 4, and FIG. 5, the handle 25 comprises an elongated design which enables users to comfortably pull on the handle mechanism 2. As can be seen in FIG. 4, the handle 25 comprises a handle body 30, a handle loop 31, and a handle hinge end 32. Preferably, the handle body 30 comprises an elongated cylindrical design with a diameter matching the inner diameter of the sleeve 23. However, the handle body 30 may comprise any other shape and size, as long as the intents of the present invention are not altered. In order to provide connection between the swivel hinge 24 and the handle 25, the swivel hinge end 29 is connected to the handle hinge end 32. Further, the handle hinge end 32 is terminally connected to the handle body 30 and the handle loop 31 is positioned opposite to the handle hinge end 32, across the handle body 30. As seen in FIG. 4, the handle loop 31 is an ergonomic loop for a user to engage their hand and hold on to the handle 25. However, the handle loop 31 may comprise any other shape, design or size, as long as the intents of the present invention are not altered. In the preferred embodiment, the handle mechanism 2 comprises a length large enough to fit under the seat panel 5. As seen in FIG. 5, the handle body 30 may be pushed through sleeve 23 and stoved under the seat panel 5 when not in use. In alternate embodiments, the handle mechanism 2 can be replaced with a motorized mechanism to automatically transport the beach wagon without the need to physically move the beach wagon. In order to accomplish the smooth functioning of the handle mechanism, a transversal cross section of the sleeve 23 is made bigger than transversal cross sections of the swivel hinge 24 and the handle body 30. This enables the handle 25 to be operatively coupled to the sleeve 23, such that the sleeve 23 enables pushing in or pulling out of the handle body 30 along the second surface 11 of the seat panel 5. In other words, when needed, the handle 25 may be pulled out from under the seat of the beach wagon, and when not in use, the handle 25 may be pushed inward and stored under the seat of the beach wagon.

In the preferred embodiment, the present invention is designed for easy transportation in irregular terrains. As can be seen in FIG. 1-13, the plurality of wheels 3 comprises four wheels that are mounted adjacent the four corners of the seat panel 5. Further, the plurality of wheels 3 is designed for movement across beach terrain with a size large enough to facilitate the rotation of the wheels on sand as well as special threading to increase friction on the sand. Accordingly, the present invention comprises a wheel housing 33 and a wheel locking mechanism 34 for the smooth functioning of the plurality of wheels 3. Preferably, the wheel housing 33 is integrated between the plurality of wheels 3 and the second surface 11 of the seat panel 5, such that the wheel housing 33 connects the plurality of wheels 3 to the frame 1 and facilitates the rotation of the wheels. Preferably, the wheel housing 33 is a modular wheel system, such that wheels or tires of different sizes and shapes may be integrated into the beach wagon for easy transportation along a wide variety of spaces and terrains. However, the wheel housing 33 may comprise any other shape, size and mechanism that is known to one of ordinary skill in the art, as long as the objectives of the present invention are fulfilled. As seen in FIG. 12, at least two wheels from the plurality of wheels 3 are rotatably coupled to the wheel housing 33, such that the user can easily swivel and maneuver the beach wagon for easy navigation. In other words, at least two wheels (front wheels) may be designed to freely spin, while the rest of the wheels are fixed to a determined orientation. As seen in FIG. 8, the wheel locking mechanism 34 is integrated between the wheel housing 33 and at least one of the plurality of wheels 3, so as to lock the wheel and prevent rolling of the wheels or the movement of the beach wagon during undesired conditions. It should be noted that the wheel locking mechanism 34 may comprise any size, shape, and technology known to one of ordinary skill in art, as long as the objectives of the present invention are not altered.

Figure 11:
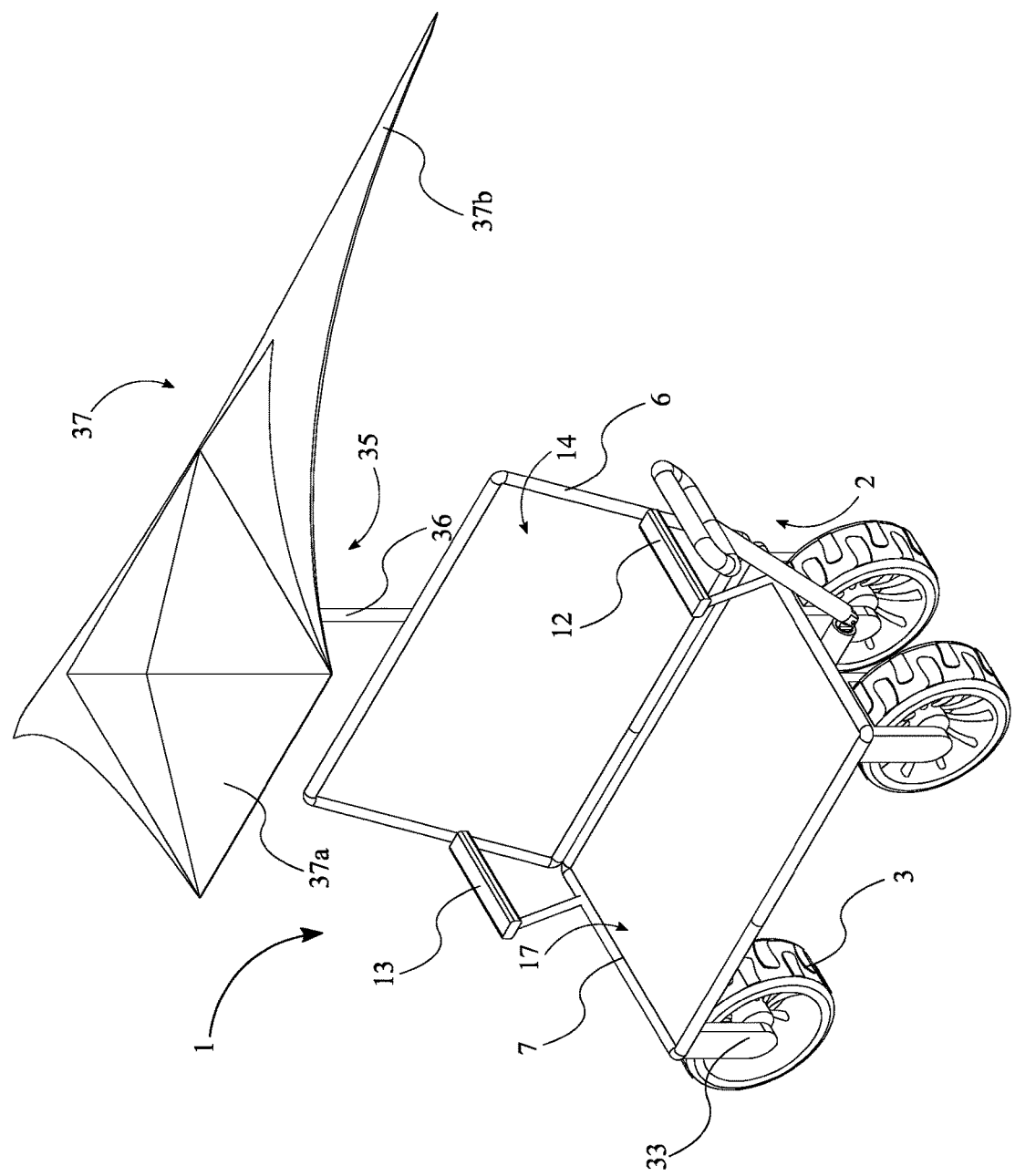
FIG. 11 is a top perspective view of the present invention showing the beach wagon with the umbrella attachment.
Figure 12:
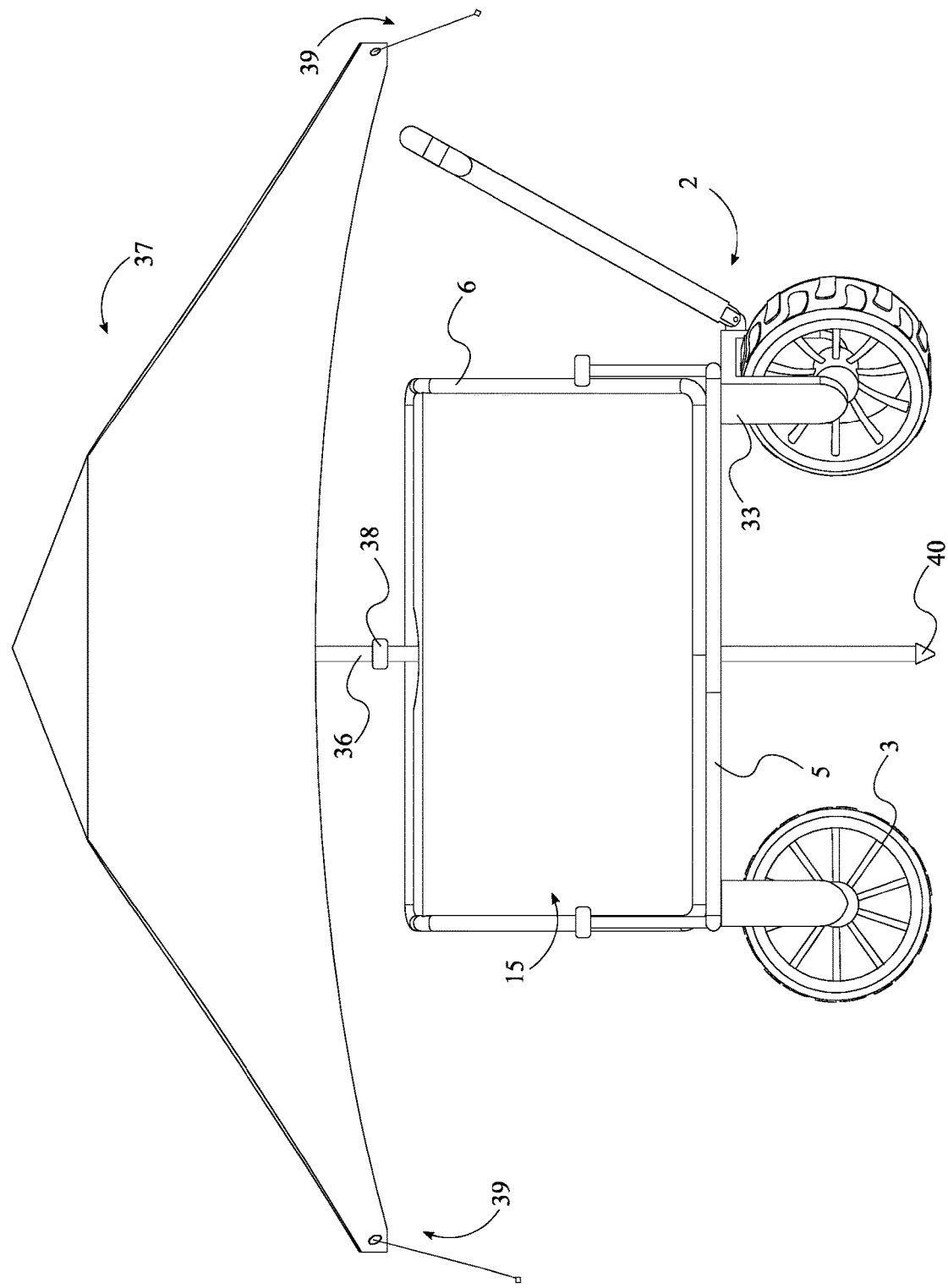
FIG. 12 is a rear view of the present invention showing the beach wagon with the umbrella attachment deployed.

In reference to FIG. 11 and FIG. 12, the present invention comprises an umbrella attachment 35. Preferably, the umbrella attachment 35 is provided as a removable feature to provide shade to the users sitting on the beach wagon in the chair configuration. In other words, the umbrella attachment 35 is a deployable attachment which can be used during the chair configuration to provide shade to the users. As seen in FIG. 12, the umbrella attachment 35 is removably attached to the back panel 6 through one or more openings on the second back panel surface 15. In the preferred embodiment, the umbrella attachment 35 comprises a pole structure 36, a canopy 37, a deployment mechanism 38, and an anchoring mechanism 39. As seen in FIG. 12, the pole structure 36 comprises a spike 40, wherein the spike 40 is terminally connected to the pole structure 36 to secure the pole structure 36 to the ground. Preferably, the pole structure 36 comprises a modular design with multiple pole sections which can be terminally connected to each other to form a single elongated pole. However, the pole structure 36 may comprise any other size, shape and mechanism that is known to one of ordinary skill in the art, that does not hinder the intents of the present invention. As seen in FIG. 11 and FIG. 12, the canopy 37 comprises a rectangular center section 37a and a plurality of corner extensions 37b, wherein the rectangular center section 37a large enough to cover the seat panel 5. The plurality of corner extensions 37b are preferably oriented away from the frame 1 and comprise a triangular design. Preferably, the canopy 37 comprises a sturdy yet flexible material that can provide SPF protection. However, the canopy 37 may comprise any other size, shape, orientation, and material that is known to one of ordinary skill in the art, as long as the intents of the present invention are fulfilled. Further, the canopy 37 is positioned opposite to the spike 40 about the pole structure 36. The deployment mechanism 38 is connected in between the pole structure 36 and the canopy 37 to enable users to selectively deploy or store away the canopy 37. Further, the anchoring mechanism 39 is connected to the plurality of corner extensions 37b such that the canopy can be anchored to the ground. In alternate embodiments, the umbrella attachment 35 comprises a different mechanism with alternate structure designs. Further, in alternate embodiments, the umbrella attachment 35 may be integrated into the frame 1 of the beach wagon.

Figure 13:
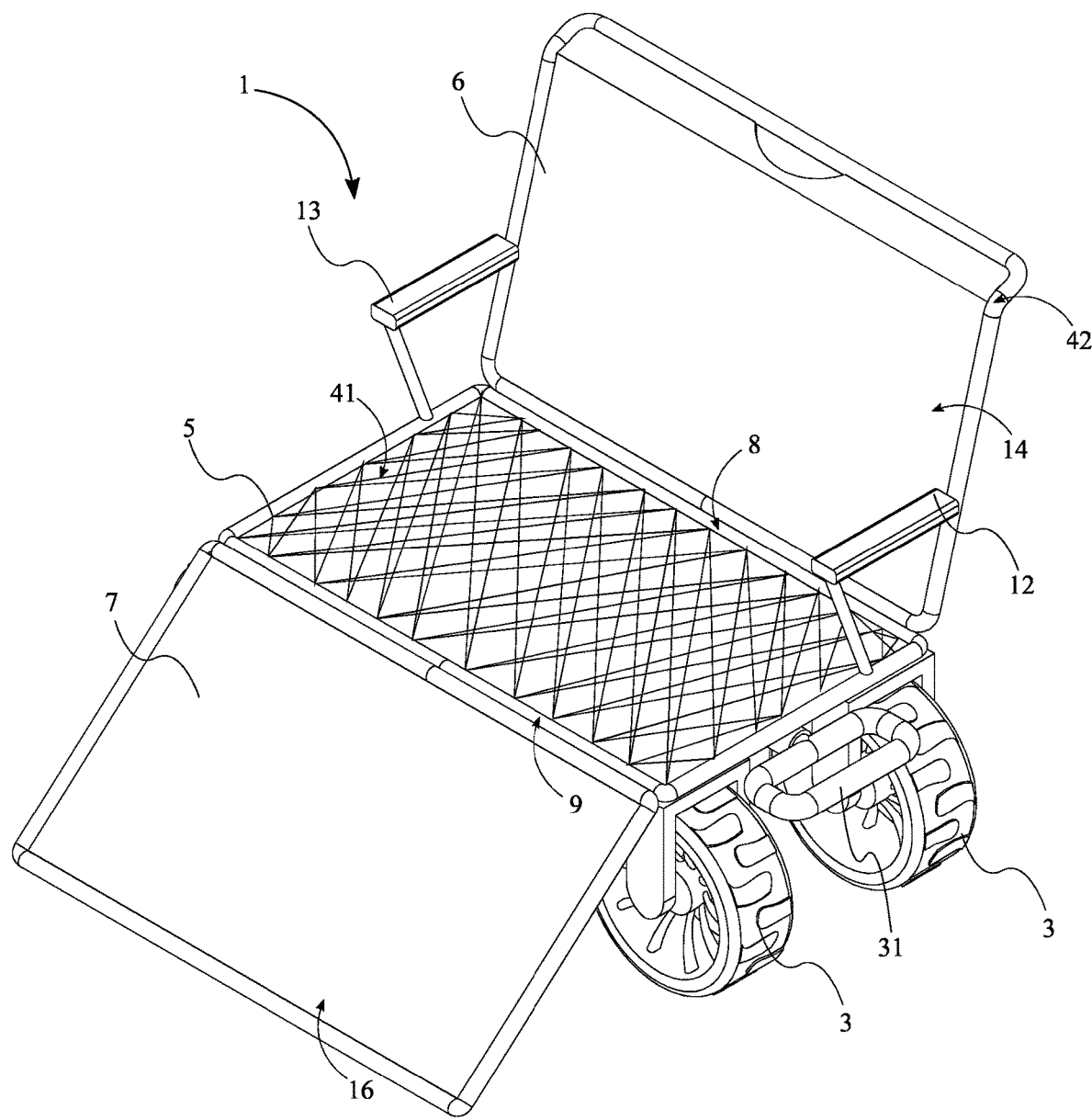
FIG. 13 is a top-front-left perspective view of the present invention showing a seat panel with mesh surface.

In reference to FIG. 13, the seat panel 5 is a mesh surface 41, such that sand can fall through the gaps, thereby keeping the beach wagon clean, and/or for enabling an easier clean up. As seen in FIG. 1, FIG. 3, FIG. 7, and FIG. 9, the back panel 6 comprises a bent surface 42 adjacent an upper edge of the back panel 6. This bent provides additional comfort for users to rest their neck/head in the chair configuration. However, the back panel 6 may have any other shape or orientation, as long as the intents of the present invention is not altered.

To provide more comfort to the users, the present invention comprises various features that increase the functionality of the beach wagon. To that end, the present invention comprises a plurality of secondary attachments, wherein the plurality of secondary attachments is attached to the frame 1. Examples of the plurality of secondary attachments include, but are not limited to cup holders, bike hitch attachments, a plurality of storage sections etc. For example, cup holders may be mounted onto the set of armrests or the frame. The plurality of secondary attachments and the umbrella attachment may be stored in a bigger storage pocket 43. The storage pocket 43 is preferably provided on the bottom of the seat panel 5, in between the plurality of wheels 3. Furthermore, the beach wagon may comprise a hitch attachment as a secondary attachment, which enables the beach wagon to be secured to the hitch of a vehicle. In alternate embodiments, the plurality of attachments and the storage pocket can be modified to meet other needs corresponding to other applications.

Although the invention has been explained in relation to its preferred embodiment, it is to be understood that many other possible modifications and variations can be made without departing from the spirit and scope of the invention as hereinafter claimed.

What is claimed is:

1. A multifunctional beach wagon comprising:
a frame;
a handle mechanism;
a plurality of wheels;
a plurality of locking hinges;
the frame comprising a seat panel, a back panel, and a leg panel;
the seat panel comprising a first seat edge, a second seat edge, a first surface and a second surface;
the first seat edge being positioned opposite to the second seat edge across the seat panel;
the first surface being positioned opposite to the second surface across the seat panel;
the back panel being hingedly connected to the first seat edge;
the leg panel being hingedly connected to the second seat edge;
the handle mechanism being integrated into the frame;
the plurality of wheels being connected onto the second surface of the seat panel;
the plurality of locking hinges being integrated between the seat panel, the back panel and the leg panel; and
the plurality of locking hinges being operatively coupled to the frame, wherein the plurality of locking hinges enables the frame to switch between a wagon configuration, a chair configuration and a collapsed configuration;
a first arm rest;
a second arm rest;
the first armrest and the second armrest being connected between the seat panel and the back panel;
the first armrest and the second armrest being vertically offset from the seat panel;
the first armrest and the second armrest being laterally offset;
the plurality of locking hinges being integrated between the first armrest and the frame;
the plurality of locking hinges being integrated between the second armrest and the frame;
a first back panel surface and a second back panel surface;
a first leg panel surface and a second leg panel surface;
the first back panel surface being positioned opposite to the second back panel surface across the back panel;
the first leg panel surface being positioned opposite to the second leg panel surface across the leg panel;
a padded layer;
at least one head rest;
the padded layer being mounted onto the second leg panel surface; and
the at least one head rest being mounted onto the first back panel surface.

2. The multifunctional beach wagon of claim 1, wherein the frame is in the wagon configuration, the frame comprising:
a first side panel;
a second side panel;
the first side panel and the second side panel being removably attached between the first back panel surface and the first leg panel surface;
the first side panel being laterally offset from the second side panel;
the back panel and the leg panel being angularly offset from the seat panel;
the plurality of locking hinges being placed in a locked position; and
the leg panel being positioned opposite to the back panel across the seat panel, wherein the first leg panel surface faces the first back panel surface.

3. The multifunctional beach wagon of claim 1, wherein the frame is in the chair configuration, the frame comprising:
the leg panel being folded and positioned over the first surface of the seat panel, such that the first leg panel surface is pressed against the seat panel;
at least one of the plurality of locking hinges being placed in a locked position; and
the back panel being angularly offset from the seat panel.

4. The multifunctional beach wagon of claim 1, wherein the frame is in the collapsed configuration, the frame comprising:
the plurality of locking hinges being placed in a collapsed position;
the first armrest and the second armrest being folded and positioned over the first surface of the seat panel;
the leg panel being folded and positioned over the seat panel, wherein the first leg panel surface faces the first surface of the seat panel; and
the back panel being folded and positioned over the leg panel, wherein the first back panel surface is pressed against the second leg panel surface.

5. The multifunctional beach wagon in claim 1 comprising:
a cooler attachment;
the cooler attachment being attached to the second back panel surface.

6. The multifunctional beach wagon in claim 1, the handle mechanism comprising:
a sleeve;
a swivel hinge;
a handle;
the sleeve comprising a cavity;
the swivel hinge comprising a swivel body, a stopper, and a swivel hinge end;
the handle comprising a handle body, a handle loop, and a handle hinge end;
the cavity traversing through the sleeve;
the sleeve being connected to the seat panel;
the swivel body being threaded through the cavity;
the stopper being terminally connected to the swivel body;
the swivel hinge end being positioned opposite to the stopper across the swivel body;
the swivel hinge end being connected to the handle hinge end;
the handle hinge end being terminally connected to the handle body; and
the handle loop being positioned opposite to the handle hinge end, across the handle body.

7. The multifunctional beach wagon in claim 6, comprising:
a transversal cross section of the sleeve being bigger than transversal cross sections of the swivel hinge and the handle body; and
the handle being operatively coupled to the sleeve, wherein the sleeve enables pushing in or pulling out of the handle body along the second surface of the seat panel.

8. The multifunctional beach wagon in claim 1, comprising:
a wheel housing;
a wheel locking mechanism;
the wheel housing being integrated between the plurality of wheels and the second surface of the seat panel;
at least two wheels from the plurality of wheels being rotatably coupled to the wheel housing; and
the wheel locking mechanism being integrated between the wheel housing and at least one of the plurality of wheels.

9. The multifunctional beach wagon of claim 8, wherein the wheel housing is a modular wheel system.

10. The multifunctional beach wagon in claim 1, comprising:
an umbrella attachment; and
the umbrella attachment being removably attached to the back panel.

11. The multifunctional beach wagon in claim 10, the umbrella attachment comprising:
a pole structure;
a canopy;
a deployment mechanism;
an anchoring mechanism;
the pole structure comprising a spike;
the canopy comprising a rectangular center section and a plurality of corner extensions;
the spike being terminally connected to the pole structure;
the deployment mechanism being connected in between the pole structure and the canopy; and
the anchoring mechanism being connected to the plurality of corner extensions.

12. The multifunctional beach wagon in claim 1, wherein the seat panel is a mesh surface.

13. The multifunctional beach wagon in claim 1, wherein the back panel comprises a bent surface.

14. The multifunctional beach wagon in claim 1, comprising:
a plurality of secondary attachments; and
the plurality of secondary attachments being attached to the frame.

* * * * *